United States Patent
Spruner von Mertz et al.

(10) Patent No.: US 7,568,239 B2
(45) Date of Patent: Aug. 4, 2009

(54) SINK ACCESSORY THAT IS USABLE IN A VERSATILE MANNER, AND ALSO A SINK INCLUDING SUCH A SINK ACCESSORY

(75) Inventors: Gert Spruner von Mertz, Eppingen (DE); Frank Merkel, Ditzingen (DE); Hans-Joachim Schreiber, Bretten (DE)

(73) Assignee: BLANCO GmbH + Co KG, Oberderdingen (DE)

( * ) Notice: Subject to any disclaimer, the term of this patent is extended or adjusted under 35 U.S.C. 154(b) by 0 days.

(21) Appl. No.: 11/683,769

(22) Filed: Mar. 8, 2007

(65) Prior Publication Data
US 2007/0209110 A1    Sep. 13, 2007

Related U.S. Application Data

(63) Continuation of application No. PCT/EP2005/009971, filed on Sep. 16, 2005.

(30) Foreign Application Priority Data
Sep. 17, 2004    (DE) ............... 10 2004 046 005

(51) Int. Cl.
*A47J 47/20* (2006.01)
*A47L 19/02* (2006.01)
(52) U.S. Cl. .............................. 4/654; 4/656
(58) Field of Classification Search ............ 4/559, 4/571.1, 578.1, 579, 654, 656, 659
See application file for complete search history.

(56) References Cited

U.S. PATENT DOCUMENTS 3,213,565 A * 10/1965 Grosz ..................... 4/559
4,041,964 A * 8/1977 Shamoon ............... 134/115 R
5,406,656 A * 4/1995 Somerton ............... 4/656
5,815,855 A * 10/1998 McKeehan et al. ........ 4/631

(Continued)

FOREIGN PATENT DOCUMENTS

DE        652028        4/1951

(Continued)

OTHER PUBLICATIONS

International Search Report corresponding to International Application No. PCT/EP2005/009971, mailed Jan. 11, 2006.

*Primary Examiner*—Tuan N Nguyen
(74) *Attorney, Agent, or Firm*—Hanley, Flight & Zimmerman, LLC.

(57) ABSTRACT

The subject matter of the application is a sink accessory (e.g. a cutting board) that can be placed on a sink and a sink that is provided with a sink accessory of this type. Hereby, the periphery of the sink accessory comprises two differently spaced bearing surfaces which lie at different heights with respect to the surface of the sink accessory. In this way it is possible for one and the same sink accessory to be selectively placed on different supporting surfaces of the same sink, on the supporting surfaces of different sinks or on the supporting surface of another sink accessory (e.g. a strainer). In dependence on the geometry thereby, only the first bearing surface is in contact with the sink in a first position, whereas the second bearing surface is used as a contact area in the second position.

18 Claims, 9 Drawing Sheets

U.S. PATENT DOCUMENTS 7,086,099 B2 *   8/2006   Rocci ........................... 4/656
7,246,387 B2 *   7/2007   Erickson et al. ................ 4/631

FOREIGN PATENT DOCUMENTS

| DE | 93 16 147.6 | 1/1994 |
| DE | 201 12 173 U1 | 11/2001 |
| DE | 201 17 624 U1 | 3/2002 |
| WO | WO 00/58572 | 10/2000 |

* cited by examiner

SINK ACCESSORY THAT IS USABLE IN A VERSATILE MANNER, AND ALSO A SINK INCLUDING SUCH A SINK ACCESSORY

RELATED APPLICATION

This application is a continuation application of PCT/EP2005/009971 filed Sep. 16, 2005, the entire specification of which is incorporated herein by reference.

FIELD OF DISCLOSURE

The present invention relates to a sink accessory which is adapted to be placed on a sink, wherein the sink accessory comprises at least one first bearing surface with which the sink accessory is adapted to be placed on at least one supporting surface of the sink.

BACKGROUND

Such sink accessories are known from the state of the art and are, for example, in the form of cutting boards which are fixable to the sink at a defined working position or are guided on the sink in displaceable manner in a direction of displacement.

SUMMARY OF THE INVENTION

The object of the present invention is to provide a sink accessory of the type mentioned hereinabove which is usable in a versatile manner.

In accordance with the invention, this object is achieved in the case of a sink accessory comprising the features indicated in the first part of Claim 1 in that the sink accessory comprises at least one second bearing surface with which the sink accessory is adapted to be placed on a supporting surface of a sink or on a supporting surface of another sink accessory, wherein the second bearing surface of the sink accessory is arranged at a different height level of the sink accessory than the first bearing surface.

This arrangement in accordance with the invention enables the geometry of the first bearing surface to be adapted to the geometry of a first supporting surface of the sink so that the sink accessory is positionable on the sink at a first working position, and also enables the geometry of the second bearing surface of the sink accessory to be adapted to the geometry of a second supporting surface which may be formed on the same sink, on another sink or on another sink accessory in order to position the sink accessory on the same sink, on another sink or on another sink accessory at a second working position which is different from the first working position.

In this way, it is possible to selectively place one and the same sink accessory on different supporting surfaces of the same sink, on the supporting surfaces of different sinks or on the supporting surface of another sink accessory such as a strainer for example.

The sink accessory in accordance with the invention can thus also be used, in particular, on several mutually differing sinks which have mutually differing dimensions.

Furthermore, the sink accessory in accordance with the invention can be stacked on other sink accessories, for example, on drainers and strainers.

In addition to the first bearing surface and the second bearing surface, the sink accessory in accordance with the invention may also comprise yet further bearing surfaces at other height levels in order to increase the versatility of the sink accessory still further.

The sink, on which the sink accessory is adapted to be placed, may comprise one or more sink bowls and be formed with or without a drainage surface.

In this description and in the attached Claims, the term "sink" also covers any possible work top upon which a sink bowl is arranged.

In particular, the sink can comprise a work top incorporating a work top cut-out and a sink bowl in the form of a built-under bowl arranged on the lower surface of the work top. In this case, the supporting surface of the sink upon which the sink accessory is adapted to be placed is formed on the work top. The construction of the sink accessory in accordance with the invention enables one and the same sink accessory to be used with different sinks having work top cut-outs of mutually differing internal dimensions.

In a preferred embodiment of the sink accessory, provision is made for the sink accessory to comprise at least one first positioning surface which cooperates with a positioning surface of the sink when a sink accessory is placed on the sink, and at least one second positioning surface which cooperates with a positioning surface of the sink or that of another sink accessory when the sink accessory is placed on the same sink or on another sink or on the other sink accessory, wherein the second positioning surface is arranged at a different height level of the sink accessory than the first positioning surface.

Hereby, the first positioning surface of the sink accessory can, for example, be a guidance surface which cooperates with a guidance surface of the sink when the sink accessory is placed on the sink in order to guide the sink accessory in the course of a displacement relative to the sink along a direction of displacement.

The first positioning surface can also be formed as a stop surface which cooperates with a stop surface of the sink when the sink accessory is placed on the sink in order to limit the displacement path of the sink accessory relative to the sink or to fix the sink accessory in a working position relative to the sink.

In this description and the attached Claims, the term "fixing" is not to be understood as meaning fastening, but rather, as defining the relative position of two elements in at least one direction, apart that is, from a small amount of play between the two elements.

The size of this play between the elements involved is usually due to the constructional tolerances of these elements (i.e. for example, the sink accessory and the sink).

The second positioning surface of the sink accessory and the positioning surfaces of the sink or of the other sink accessory can likewise be in the form of guidance and/or stop surfaces.

In addition to the first positioning surface and the second positioning surface, the sink accessory may also comprise yet more positioning surfaces at other height levels in order to increase the versatility of the sink accessory still more.

In order to enable the sink accessory to be used with sinks and/or other sink accessories each of which comprises several positioning surfaces that cooperate with the sink accessory and wherein the mutual spacings between these positioning surfaces are different, provision is preferably made for the sink accessory to comprise at least two first positioning surfaces which are arranged at the same height level of the sink accessory and both of which extend along the same direction of the sink accessory and are spaced from each other in a direction perpendicular to this direction, and at least two second positioning surfaces which are likewise arranged at the same height level although this is different from the height level of the first positioning surfaces of the sink accessory, and which extend along the same direction of the sink accessory and are spaced from each other in a direction perpendicular to this direction, wherein the second positioning surfaces are at a different distance from each other than the first positioning surfaces.

Hereby for example, the first and the second positioning surfaces can be in the form of guidance surfaces and/or stop surfaces of the sink accessory.

In particular, provision may be made for the second positioning surfaces to be arranged at a lower height level of the sink accessory than the first positioning surfaces.

Furthermore, provision can be made for the second positioning surfaces to be at a smaller spacing from each other than the first positioning surfaces.

In a preferred embodiment of the sink accessory, provision is made for the sink accessory to comprise at least two first positioning surfaces which are both arranged at the same height level of the sink accessory and are oriented transversely, preferably substantially perpendicularly, to one another, and also at least two second positioning surfaces which are likewise arranged at the same height level of the sink accessory but at one that is different from the height level of the first positioning surfaces, and said second surfaces are oriented transversely, preferably substantially perpendicularly, to one another.

In this case, one of the first positioning surfaces and/or one of the second positioning surfaces of the sink accessory can serve, in particular, as a guidance surface and the other first positioning surface or second positioning surface that is oriented transversely to the guidance surface can serve as a stop surface of the sink accessory.

In particular, the bearing surfaces and the positioning surfaces of the sink accessory can border one another in such a manner that, together, they form positioning steps (guide steps and/or stop steps) of the sink accessory.

Provision may be made, in particular, for at least one first bearing surface and one first positioning surface of the sink accessory to border one another and together, to form a first positioning step of the sink accessory.

Alternatively or in addition thereto, provision may be made for at least one second bearing surface and at least one second positioning surface of the sink accessory to border one another and together, to form a second positioning step of the sink accessory.

In a preferred embodiment of the sink accessory, provision is made for the sink accessory to comprise at least one positioning element which comprises at least one first bearing surface and at least one second bearing surface, wherein the first bearing surface and the second bearing surface are arranged at different height levels of the positioning element.

Furthermore, provision may be made for the sink accessory to comprise at least one positioning element which comprises at least one first positioning surface and at least one second positioning surface, wherein the first positioning surface and the second positioning surface are arranged at different height levels of the positioning element.

Such a positioning element can be in the form of a foot part of the sink accessory for example.

As an alternative thereto, provision may also be made for the positioning element to be in the form of a strip which extends along a lateral edge of the sink accessory.

In principle, the positioning element can be formed in one piece manner with a base body of the sink accessory.

In a preferred embodiment of the invention however, provision is made for the positioning element to be in the form of a component that is manufactured separately from a base body of the sink accessory and is attached to the base body.

The positioning element can, in principle, be attached to the base body in any arbitrary manner, for example, by means of securing bolts.

Provision is preferably made however for the at least one positioning element to be adhered to the base body.

In this case it is of advantage if the positioning element comprises at least one recess for accommodating an adhesive.

In order to prevent unwanted bowing of the bearing surface of the positioning element, the positioning element can be provided with at least one spacer which is arranged in the region of the recess for the accommodation of the adhesive.

If the base body of the sink accessory comprises at least one substantially transparent region, then it is expedient furthermore for the base body to comprise at least one substantially non-transparent region and for the at least one positioning element to be attached to the substantially non-transparent region of the base body in order to prevent the positioning element from being visible through the transparent region of the base body.

The sink accessory in accordance with the invention can, in principle, exhibit any arbitrary function, for example, it may be in the form of a drainage sheet, a drainage rack, a grater, a plane, a strainer or the like.

In a preferred embodiment of the invention, the sink accessory is in the form of a cutting board.

Claim 19 is directed toward the combination of a sink and a sink accessory in accordance with the invention that is adapted to be placed on the sink.

Claim 20 is directed toward the combination of a sink, a sink accessory in accordance with the invention that is adapted to be placed on the sink and another sink accessory upon which the sink accessory in accordance with the invention is likewise adapted to be placed.

In the case of this combination, the other sink accessory can, in particular, be a container that is adapted to be hung on the sink.

Further features and advantages of the invention form the subject matter of the following description and the graphic illustration of exemplary embodiments.

BRIEF DESCRIPTION OF THE DRAWINGS

Similar or functionally equivalent elements are designated by the same reference symbols in all of the Figures.

DETAILED DESCRIPTION OF THE INVENTION

A sink bearing the general reference 100 that is illustrated in FIGS. 1 to 6 comprises a sink bowl 102 incorporating a bowl base 104 provided with a bowl discharge opening 106 therein, and also incorporating front and rear bowl side walls 108a, 108b as well as left and right bowl side walls 108c, 108d which extend substantially vertically upwardly from the bowl base 104 and also incorporating a substantially horizontally oriented peripheral bowl flange 110 which extends along the upper edges of the bowl side walls 108a to 108d.

Figure 3:
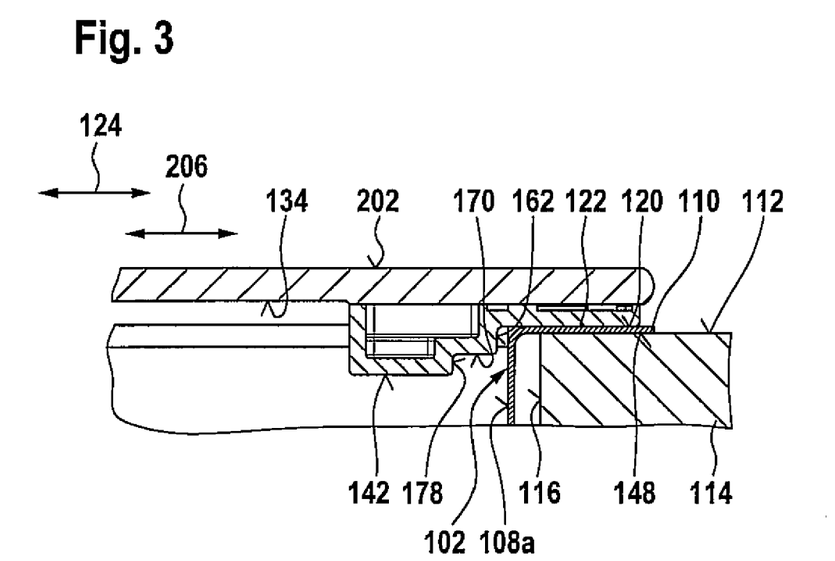
FIG. 3 a partial vertical longitudinal sectional view through the sink in FIG. 2 and the cutting board placed on the sink.

As can best be seen from FIG. 3, the lower surface of the bowl flange 110 rests on the upper surface 112 of a work top 114 which is provided with a work top cut-out 116 into which the sink bowl 102 is inserted.

Figure 1:
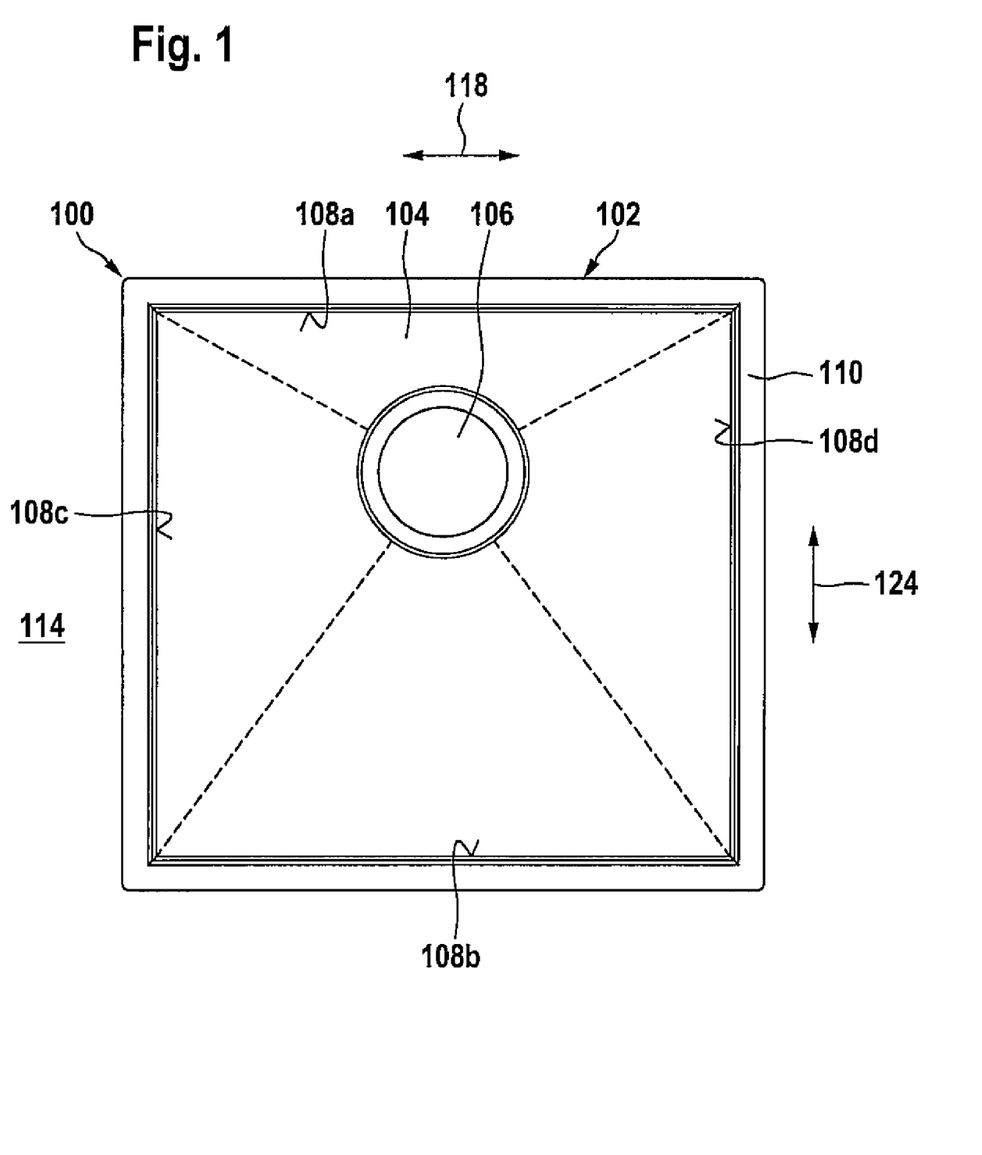
FIG. 1 shows a plan view of a sink from above, wherein a sink bowl is inserted into a work top cut-out.
Figure 2:
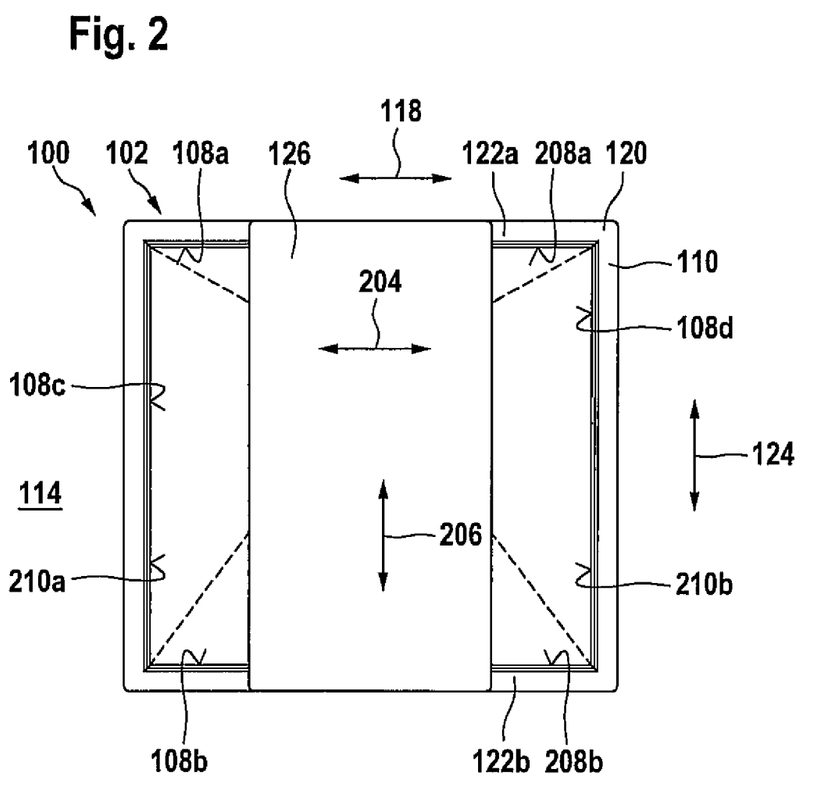
FIG. 2 a plan view of the sink in FIG. 1 from above, wherein a cutting board is placed on the sink bowl.

As can best be seen from FIG. 2, two strip-like sections of the upper surface 120 of the bowl flange 110 that extend in the longitudinal direction 118 of the sink 100 (parallel to the front and rear bowl side walls 108a, 108b) form two supporting surfaces 122a, 122b of the sink which extend in the longitudinal direction 118 of the sink 100 and are spaced from one another in the transverse direction 124 of the sink 100 that is oriented perpendicularly to the longitudinal direction 118.

The supporting surfaces 122a, 122b serve for supporting sink accessories that are adapted to be placed on the sink 100 or hung in the sink bowl 102, for example, for the purposes of supporting the cutting board 126 that is illustrated in FIG. 2.

The cutting board 126 is illustrated in detail in FIGS. 7 to 11.

Figure 7:
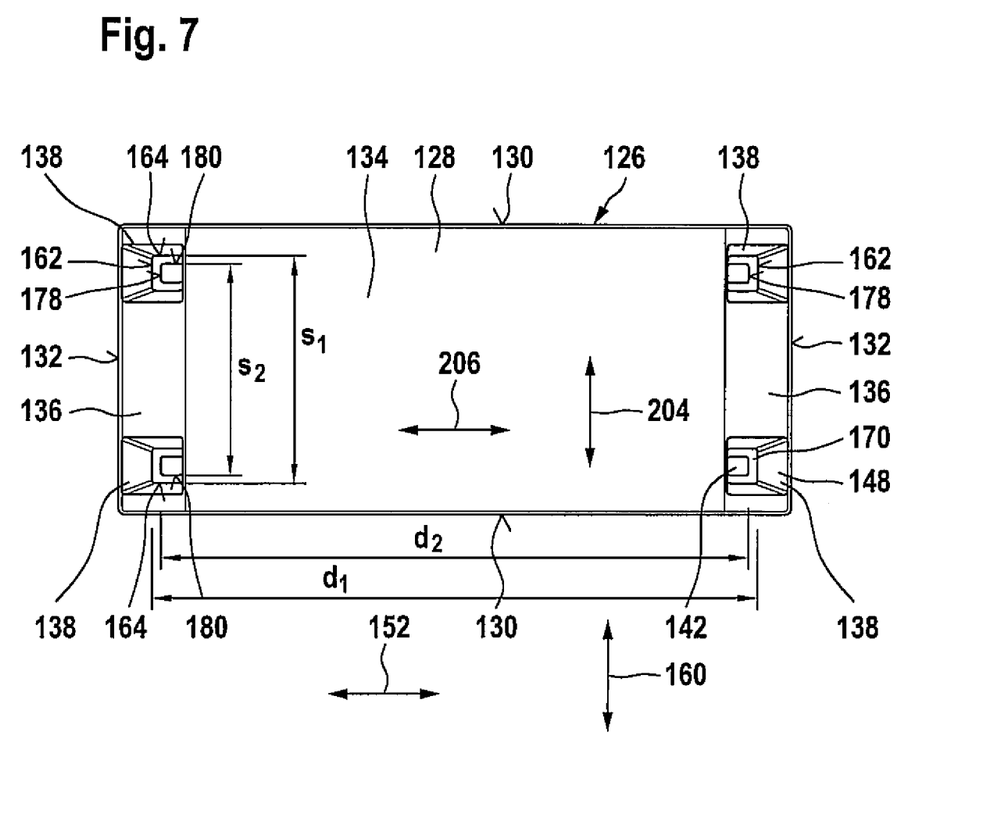
FIG. 7 a schematic plan view of the cutting board from below.
Figure 8:
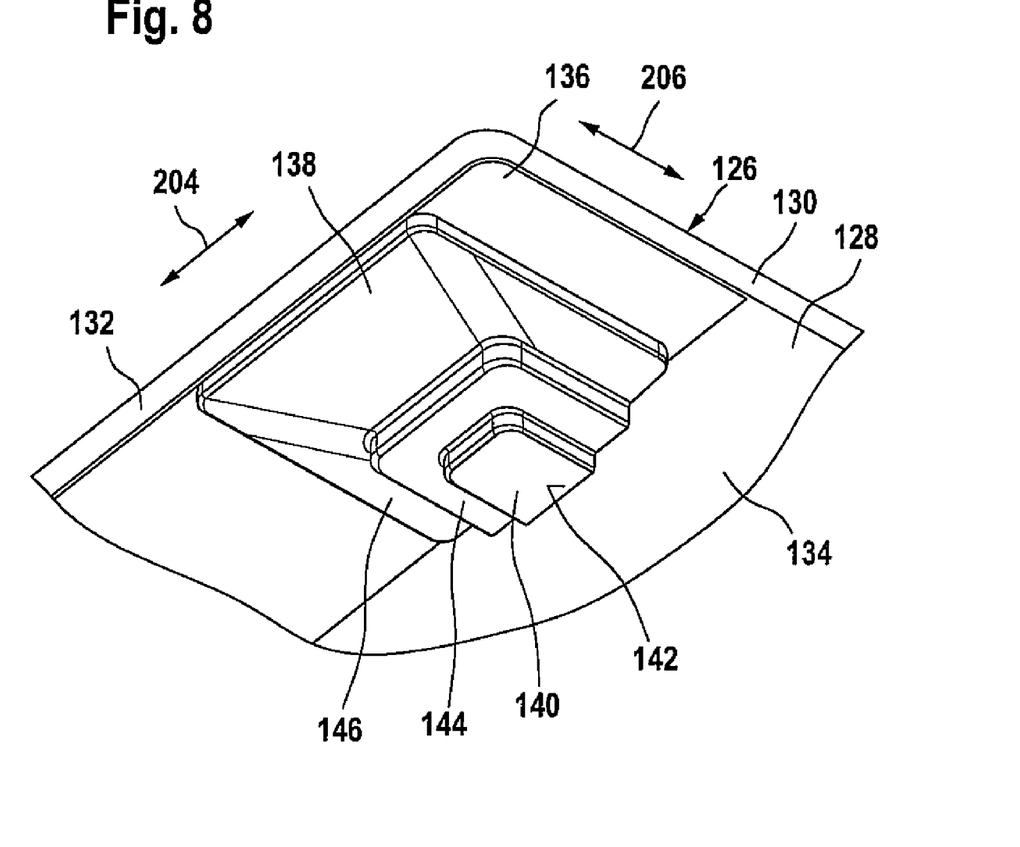
FIG. 8 a schematic perspective illustration of the lower surface of a corner of the cutting board with a positioning element arranged on the lower surface of the cutting board.
Figure 9:
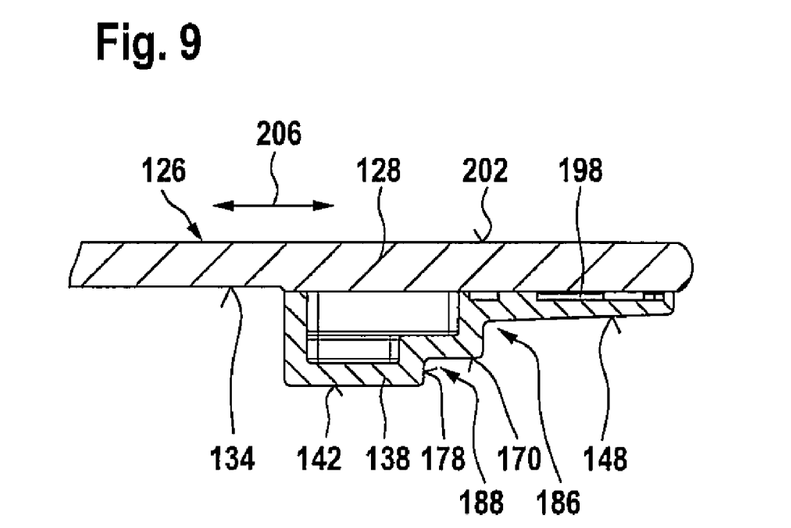
FIG. 9 a partial vertical longitudinal sectional view through the cutting board with the positioning element arranged thereon.

It comprises a substantially rectangular platter 128 made of glass or of a preferably transparent, synthetic material for example.

The platter 128 comprises mutually opposed long edges 130 whose length substantially corresponds to the extent of the sink bowl 102 in the transverse direction 124 of the sink 100, and also two mutually opposed short edges 132 whose length is significantly smaller than the extent of the sink bowl 102 in the longitudinal direction 118 of the sink 100.

The platter 128 is provided on the lower surface 134 thereof in the region of two strips 136 which run adjacent to the short edges 132 of the platter 128 with a coating consisting of an opaque material that can be applied by imprinting on the platter 128 for example.

Furthermore, the cutting board 126 is provided with four positioning elements 138 which are attached to the platter 128 in a respective corner area of the lower surface 134 of the platter 128.

The structure of these positioning elements 138 can best be seen from FIGS. 8 to 11.

Each of the positioning elements 138, which are all of identical construction, comprises a substantially rectangular parallelepiped lower part 140 having a horizontal lower surface 142 (see in particular FIG. 10), a central part 144 which adjoins the lower part 140 at that side of the lower part remote from the lower surface 142 and which is likewise in the form of a substantially rectangular parallelepiped and projects up from the lower part 140 on three sides, and also an upper part 146 which adjoins the central part 144 at that side of the central part 144 remote from the lower part 140 and is approximately in the form of a rectangular parallelepiped and which projects up from the central part 144 on three sides.

Figure 10:
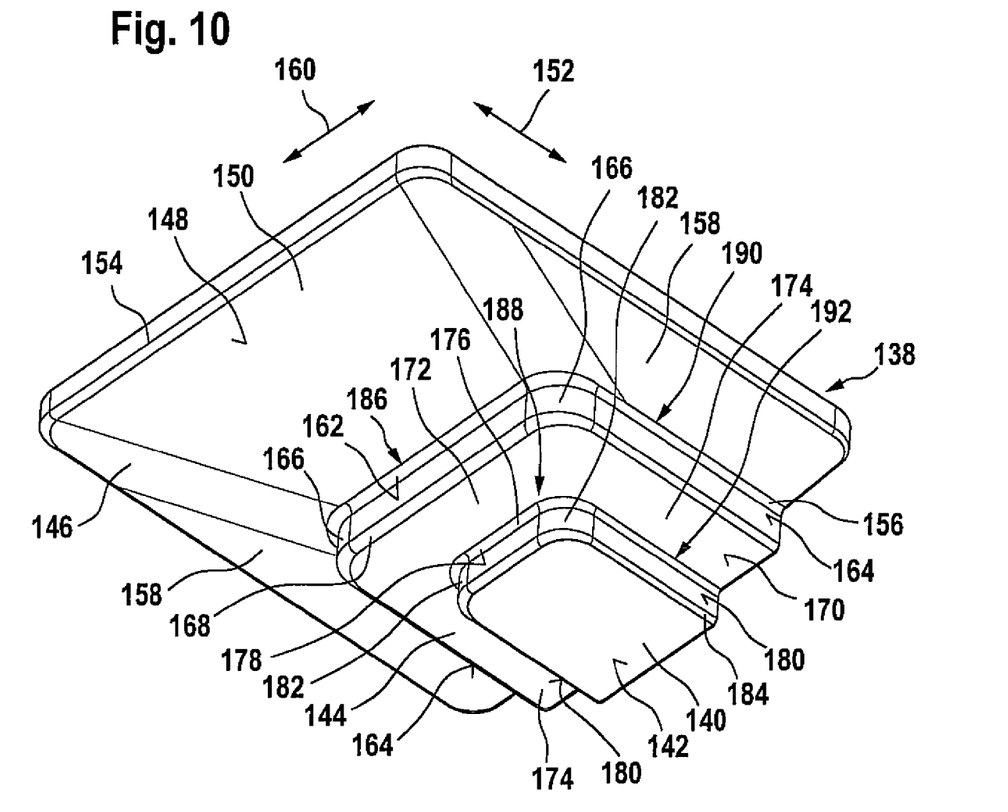
FIG. 10 a schematic perspective illustration of the positioning element in FIG. 8.

The lower surface of the upper part 146 facing the central part 144 forms a first bearing surface 148 of the positioning element 138.

This bearing surface 148 comprises a middle section 150 in which the bearing surface 148 is inclined in a direction running in the longitudinal direction 152 of the positioning element 138, whereby this inclination is arranged in such a manner that the outer edge 154 of the bearing surface 148 is somewhat higher than the inner edge 156 thereof.

Hereby, the angle of inclination between the first bearing surface 148 and the horizontal preferably amounts at most to approximately 10°, for example, approximately 3°.

Two lateral sections 158 of the first bearing surface 148 are inclined in the transverse direction 160 of the positioning element 138 that is oriented perpendicularly relative to the longitudinal direction 152, i.e. in such a manner that the outer edge 154 of the first bearing surface 148 is also somewhat higher than the inner edge 156 of the first bearing surface 148 in these lateral sections 158 of the first bearing surface 148 as well.

Preferably, the angle of inclination between the first bearing surface 148 and the horizontal in these lateral sections 158 also amounts at most to approximately 10°, for example, approximately 3°.

At the inner edge 156 thereof, the middle section 150 of the first bearing surface 148 changes into a substantially vertical first guidance surface 162 of the positioning element 138 which extends in the transverse direction 160 of the positioning element 138 and forms a lateral boundary of the central part 144 of the positioning element 138.

At the inner edge 156 thereof, each of the lateral sections 158 of the first bearing surface 148 changes into a substantially vertical first stop surface 164 of the positioning element 138 which extends in the longitudinal direction 152 of the positioning element 138 and likewise forms a lateral boundary of the central part 144 of the positioning element 138.

The first guidance surface 162 and the first stop surfaces 164 of the positioning element 138 are located at the same height level of the positioning element 138, i.e. at the same distance from the lower surface 142 of the lower part 140 and from the upper surface 196 of the upper part 146 of the positioning element, whereby the first guidance surface 162 is connected to the first stop surfaces 164 by convexly curved corner areas 166.

A substantially horizontally oriented second bearing surface 170, which forms a lower boundary of the central part 144 of the positioning element 138, adjoins those lower edges 168 of the first guidance surface 162 or of the first stop surfaces 164 that are remote from the first bearing surface 148.

The second bearing surface 170 comprises a middle section 172 which borders on the first guidance surface 162 and also two lateral sections 174 which border on a respective one of the first stop surfaces 164.

A substantially vertical second guidance surface 178 of the positioning element 138, which extends in the transverse direction 160 of the positioning element 138 and forms a lateral boundary of the lower part 140 of the positioning element 138, adjoins the inner edge 176 of the middle section 172 of the second bearing surface 170.

A respective, substantially vertically oriented second stop surface 180 of the positioning element 138, which extends in the longitudinal direction 152 of the positioning element 138 and likewise forms a lateral boundary of the lower part 140 of the positioning element 138, adjoins the inner edges 176 of the lateral sections 174 of the second bearing surface 170.

The second guidance surface 178 and the two second stop surfaces 180 of the positioning element 138 are arranged at the same height level of the positioning element 138, whereby the second guidance surface 178 is connected to the second stop surfaces 180 by convexly curved corner areas 182.

The substantially horizontally oriented lower surface 142 of the positioning element 138 adjoins the second guidance surface 178 or the second stop surfaces 180 at the lower edges 184 thereof.

The positioning element 138 thus has a stepped-pyramid-like structure, wherein the first guidance surface 162 and the middle section 150 of the first bearing surface 148 together form a first guidance step 186, the second guidance surface 178 and the middle section 172 of the second bearing surface 170 together form a second guidance step 188, each of the first stop surfaces 164 together with one of the lateral sections 158 of the first bearing surface 148 forms a respective first stop step 190 and each of the second stop surfaces 180 together with a respective lateral section 174 of the second bearing surface 170 forms a respective second stop step 192.

Figure 11:
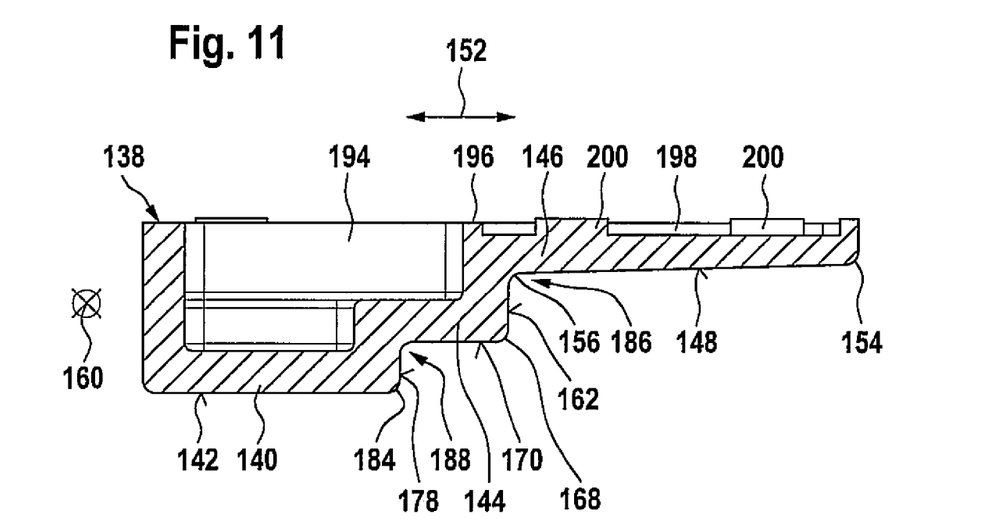
FIG. 11 a schematic vertical longitudinal sectional view through the positioning element in FIG. 10.

As can best be seen from the longitudinal sectional view in FIG. 11, each of the positioning elements 138 is provided with a stepped recess 194 which extends downwardly from the upper surface 196 of the upper part 146 into the central part 144 and the lower part 140 of the positioning element 138.

Furthermore, the positioning element 138 is provided with a shallower adhesive holding recess 198 which extends from the region of the upper surface 196 of the positioning element 138 located opposite the first bearing surface 148 into the upper part 146 of the positioning element 138.

A plurality of spacer domes 200, which extend upwardly from the bottom of the adhesive holding recess 198, are arranged in the adhesive holding recess 198.

In order to attach the positioning element 138 to the lower surface 134 of the platter 128 of the cutting board 126 by means of an adhesion process, the adhesive holding recess 198 is filled with a suitable adhesive and then the upper surface 196 of the upper part 146 of the positioning element 138 is pressed against the lower surface 134 of the platter 128, whereby the spacer domes 200 prevent unwanted bowing of the first bearing surface 148.

The positioning elements 138 are adhered to the platter 128 in the region of the opaque strips 136 so that the recesses 194, 198 of the positioning elements 138 remain invisible from the upper surface 202 of the cutting board 126 even if the platter 128 is made of a transparent material.

As can best be seen from FIG. 7, the four positioning elements 138 are adhered to the lower surface 134 of the platter 128 in such a way that the longitudinal directions 152 of the positioning elements 138 are aligned parallel to the long edges 130 of the platter 128 and the transverse directions 160 of the positioning elements 138 are aligned parallel to the short edges 132 of the platter 128.

The first guidance surfaces 162 of the positioning elements 138 thus form first guidance surfaces 162 of the cutting board 126 which extend in the transverse direction 204 of the cutting board 126 and are spaced from each other in pairs in the longitudinal direction 206 of the cutting board 126.

In like manner, the second guidance surfaces 178 of the positioning elements 138 form respective second guidance surfaces 178 of the cutting board 126 which extend in the transverse direction 204 of the cutting board 126 and are respectively spaced from each other in pairs in the longitudinal direction 206 of the cutting board 126, whereby the mutual spacing $d_2$ between the second guidance surfaces 178 in the longitudinal direction 206 is smaller than the mutual spacing $d_1$ between the first guidance surfaces 162 in the longitudinal direction 206 of the cutting board 126.

The first stop surfaces 164 of the positioning elements 138 facing the outer edges of the platter 128 form respective first stop surfaces 164 of the cutting board 126 which extend in the longitudinal direction 206 of the cutting board 126 and are spaced from each other in pairs in the transverse direction 204 of the cutting board 126.

In like manner, the second stop surfaces 180 of the positioning elements 138 facing the outer edges of the platter 128 form second stop surfaces 180 of the cutting board 126 which extend in the longitudinal direction 206 of the cutting board 126 and are spaced from each other in the transverse direction 204 of the cutting board 126, whereby the mutual spacing $s_2$ between the second stop surfaces in the transverse direction 204 is smaller than the mutual spacing $s_1$ between the first stop surfaces 164 in the transverse direction 204 of the cutting board 126.

The positioning elements 138 can be manufactured as injection moulded parts of synthetic material for example.

Figure 6:
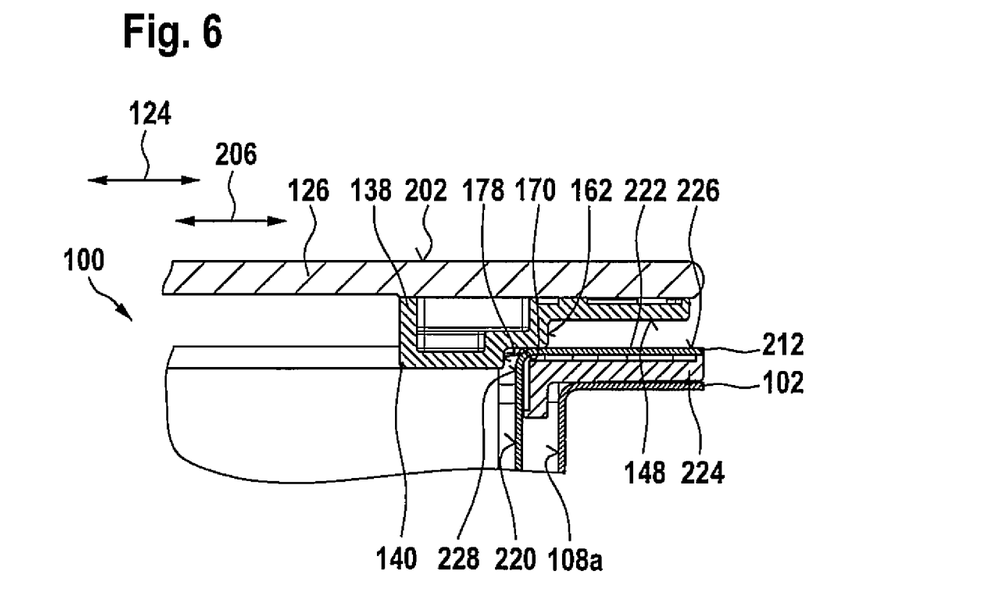
FIG. 6 a partial vertical longitudinal sectional view through the sink in FIG. 5 with the strainer hung in the sink bowl and the cutting board placed on the strainer.

As can be seen from FIGS. 2 and 6, the cutting board 126 is placed on the sink 100 in such a way that the longitudinal direction 206 of the cutting board 126 is aligned in parallel with the transverse direction 124 of the sink and the transverse direction 204 of the cutting board 126 is aligned in parallel with the longitudinal direction 118 of the sink 100, and the upper surface 202 of the cutting board 126 is oriented horizontally.

The cutting board 126 thereby rests upon the supporting surfaces 122a, 122b of the sink 100 by means of the first bearing surfaces 148 of the positioning elements 138.

Due to the inclination of the first bearing surfaces 148 with respect to the horizontal, the first bearing surfaces 148 do not rest flatly against the supporting surfaces 122a, 122b, but rather, they are in line contact therewith, this thereby facilitating the displacement of the cutting board 126 relative to the supporting surfaces 122a, 122b.

Hereby, the first guidance surfaces 162 of the cutting board 126 cooperate with the upper edge regions of the bowl side walls 108a, 108b which form the guidance surfaces 208a, 208b of the sink 100 in such a way that the cutting board 126 is guided in displaceable manner on the sink 100 in the longitudinal direction 118 of the sink, whereby the position of the cutting board 126 relative to the sink 100 in the transverse direction 124 of the sink 100 is defined, apart that is, from a slight amount of play between the first guidance surfaces 162 of the cutting board 126 and the guidance surfaces 208a, 208b of the sink 100.

The cutting board 126 can be displaced in the longitudinal direction 118 of the sink 100 until the first stop surfaces 164 of the cutting board 126, which are located at the same height level of the cutting board 126 as the first guidance surfaces 162, strike the upper regions of one of the bowl side walls 108c, 108d which extend in the transverse direction 124 of the sink 100 and form stop surfaces 210a, 210b of the sink 100.

Consequently, when the cutting board 126 is placed on the sink 100, the first stop surfaces 164 of the cutting board 126 cooperate with the stop surfaces 210a, 210b of the sink 100 in such a way that the displacement path of the cutting board 126 relative to the sink 100 is limited in the longitudinal direction 118 of the sink 100.

Furthermore, a strainer 212 is adapted to be hung in the sink bowl 102 of the sink 100.

Figure 4:
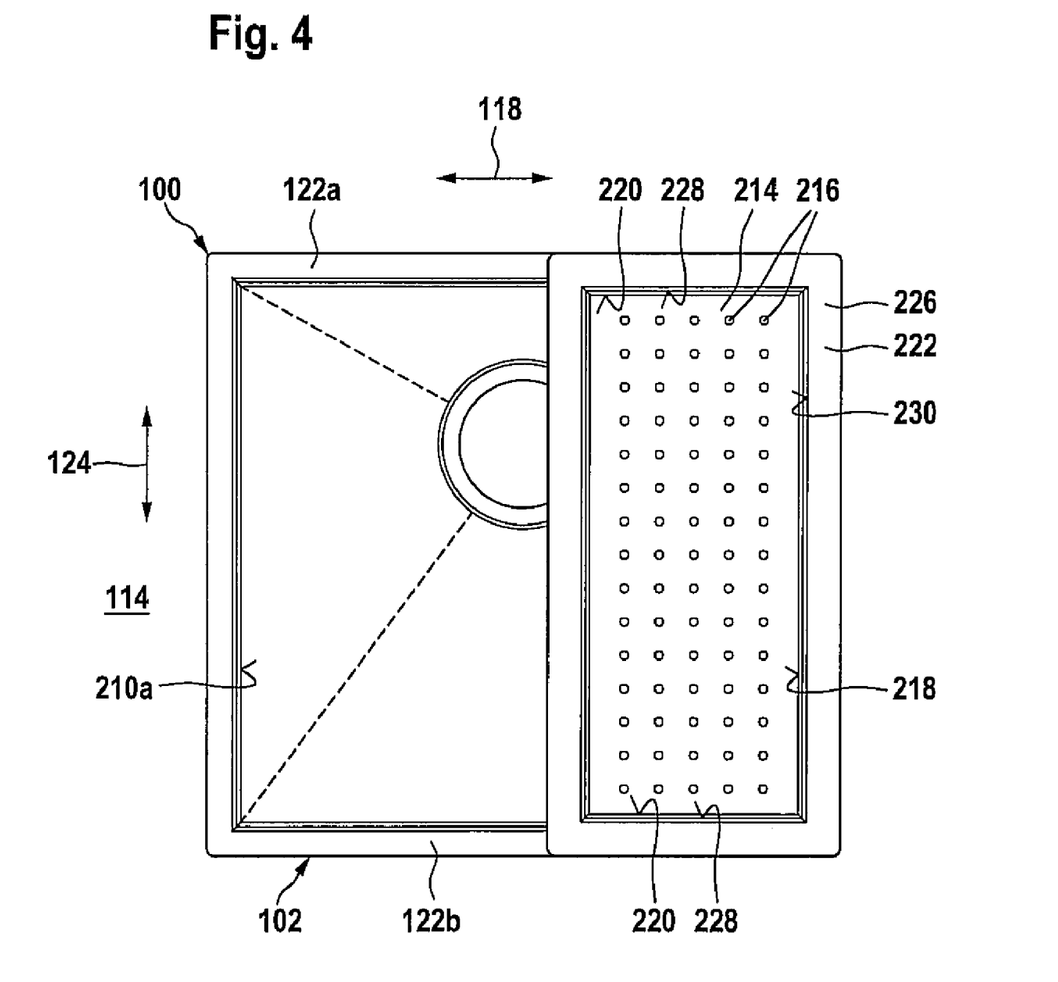
FIG. 4 a plan view of the sink in FIG. 1 from above, wherein a strainer is hung in the sink.

As can be seen from FIGS. 4 and 6, the strainer 212 comprises a container base 214 containing drainage openings 216, long side walls 218 and short side walls 220 which extend substantially vertically upwardly from the container base 214 and also a substantially horizontal container flange 222 which extends around the periphery of the upper edges of the side walls 218, 220.

Angular slide elements 224 are attached, are adhered for example, to the lower surface of the container flange 222.

When it is hung in the sink bowl 102, the strainer 212 rests with the lower surface of the slide elements 224 upon the supporting surfaces 122a, 122b of the sink 100 whereby the long side walls 218 of the strainer 212 are aligned in parallel with the transverse direction 124 and the short side walls 220 of the strainer 212 are aligned in parallel with the longitudinal direction 118 of the sink 100, and the strainer 212 is displaceable relative to the sink 100 in the longitudinal direction 118.

Figure 5:
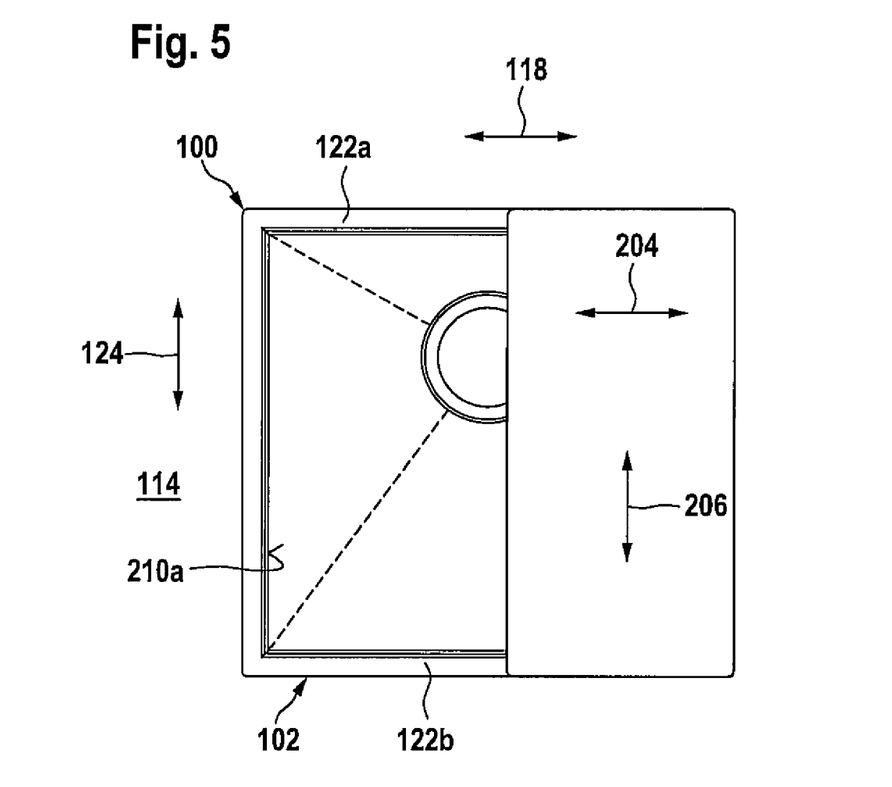
FIG. 5 a plan view from above of the sink in FIG. 4 wherein a cutting board is placed on the strainer.

In order to be able to use the cutting board 126 on the sink 100 without previously having to remove the strainer 212, and/or in order to enable the strainer 212 to be covered by means of the cutting board 126 and thereby remove the contents of the strainer 212 from an observer's view, the cutting board 126 is adapted to be placed on the strainer 212 that is hung in the sink bowl 102, namely, in such a manner that the longitudinal direction 206 of the cutting board 126 is aligned in parallel with the long side walls 218 of the strainer 212 and the transverse direction 204 of the cutting board 126 is aligned in parallel with the short side walls 220 of the strainer 212.

Since the distance between the mutually facing short side walls 220 of the strainer 212 is smaller than the mutual spacing $d_1$ between the first guidance surfaces 162 of the cutting board 126 in the longitudinal direction 206 of the cutting board 126, the cutting board 126 does not rest on the upper surface of the container flange 222 that forms a supporting surface 226 of the strainer 212 by means of the first bearing surfaces 148, but rather, by means of the second bearing surfaces 170 of the positioning elements 138.

Furthermore, the second guidance surfaces 178 of the cutting board 126 co-operate with the upper edge regions of the short side walls 220 of the strainer 212 that form the stop surfaces 228 of the strainer 212 in such a way that the position of the cutting board 126 relative to the strainer 212 in the longitudinal direction 206 of the cutting board 126 is defined, apart that is, from a small amount of play between the second guidance surfaces 178 and the guidance surfaces 228 of the strainer 212.

In a corresponding manner, the second stop surfaces 180 of the cutting board 126 that are located at the same height level as the second guidance surfaces 178 cooperate with the upper edge regions of the long side walls 218 of the strainer 212 that form the stop surfaces 230 of the strainer 212 in such a way that the position of the cutting board 126 relative to the strainer 212 in the transverse direction 204 of the cutting board 126 is defined, apart that is, from a small amount of play between the second stop surfaces 180 of the cutting board 126 and the stop surfaces 230 of the strainer 212.

In this way, it is possible to place the cutting board 126 at a defined position on the sink 100 by means of the positioning elements 138 despite the different clearance widths of the sink bowl 102 on the one hand and the strainer 212 on the other and also to guide it thereon in displaceable manner as well as place it at a defined position on the strainer 212.

Figure 12:
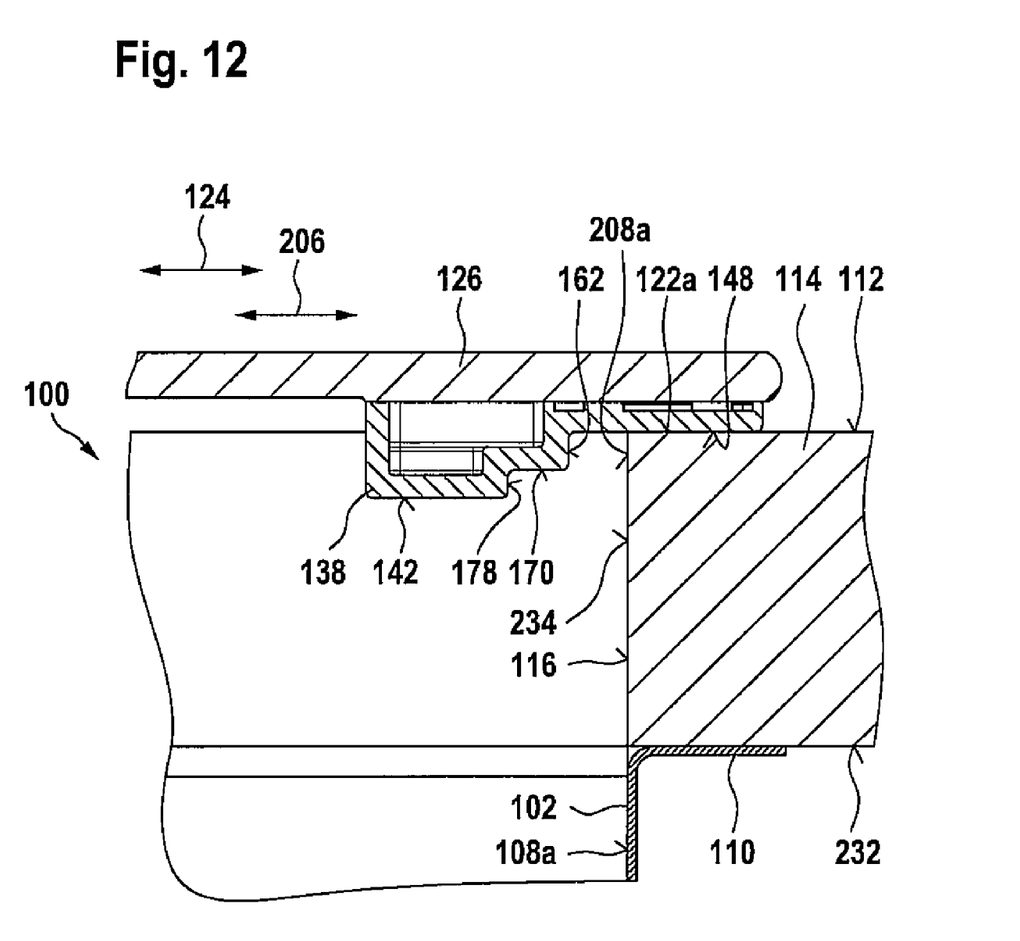
FIG. 12 a partial vertical longitudinal sectional view through a second embodiment of a sink with a cutting board placed on the sink, wherein the cutting board rests upon the work top.
Figure 13:
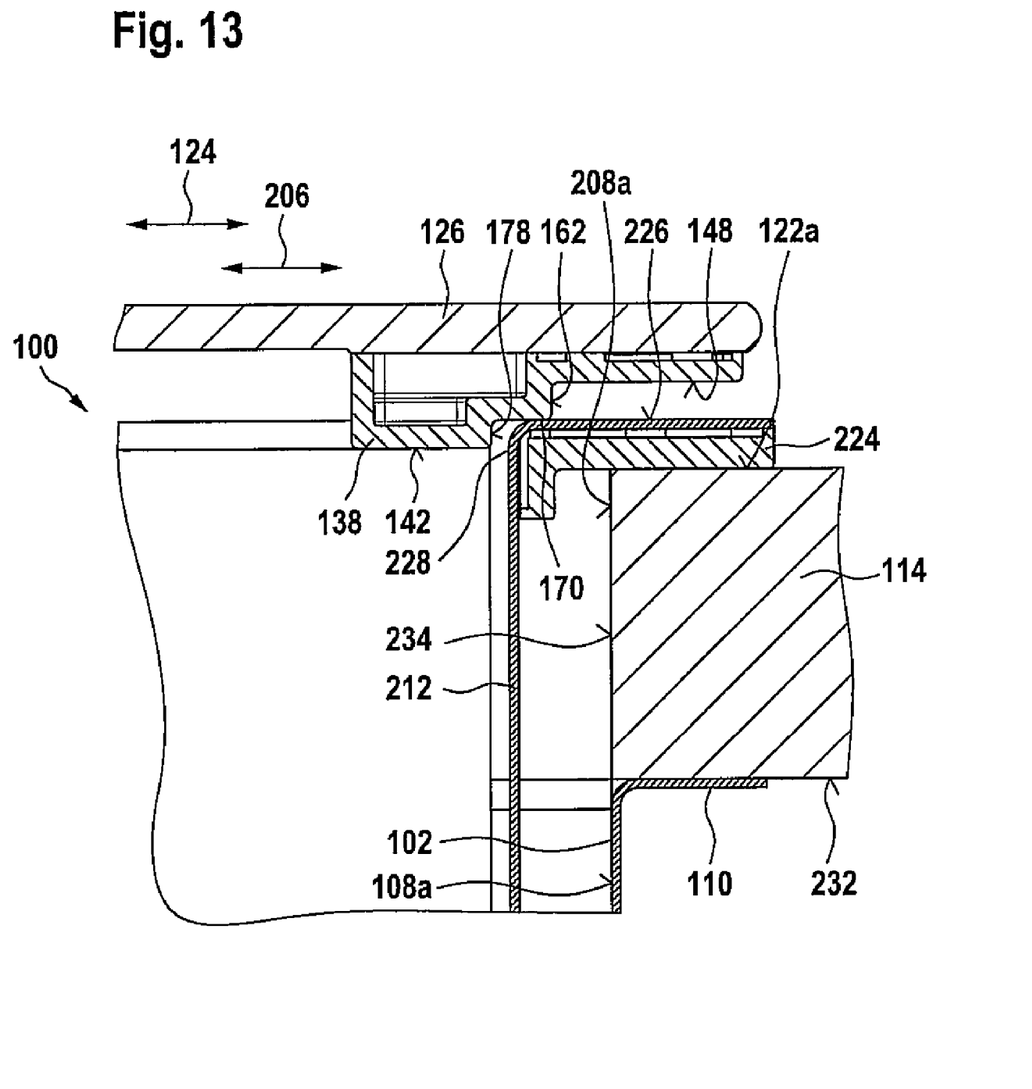
FIG. 13 a partial vertical longitudinal sectional view through the sink in FIG. 12 with a strainer hung in the work top cut-out and a cutting board placed on the strainer.

A second embodiment of a combination of a sink 100, a cutting board 126 and a strainer 212 that is illustrated in FIGS. 12 and 13 differs from the first combination illustrated in FIGS. 1 to 11 only in that the sink bowl 102 in the second embodiment is not inserted into a work top cut-out in the work top 114, but rather, is in the form of a built-under bowl which is arranged to rest against the lower surface 232 of the work top 114 by means of its bowl flange 110.

In this embodiment, the supporting surfaces 122a, 122b of the sink 100 which support the cutting board 126 or the strainer 212 are not formed on the upper surface of the bowl flange 110, but rather, on the upper surface 112 of the work top 114.

In corresponding manner, the guidance surfaces 208a, 208b of the sink 100 are not formed by the upper edge regions of the bowl side walls 108a, 108b, but rather, by the upper edge regions of the lateral boundary surfaces 234 of the work top cut-out 116.

Furthermore, in this embodiment, the stop surfaces 210a, 210b of the sink 100 are likewise formed by the upper edge regions of the boundary surfaces 234 of the work top cut-out 116.

In all other respects, the second embodiment agrees in regard to the construction and functioning thereof with the first embodiment illustrated in FIGS. 1 to 11, and to this extent reference should be made to the preceding description thereof.

The invention claimed is:

1. A combination of a sink and a sink accessory, which is adapted to be placed on the sink, wherein the sink accessory comprises an underside surface and a positioning element adjacent the underside surface, wherein the positioning element comprises at least a first bearing surface with which the sink accessory is placed, in a first position, on at least one first supporting surface of the sink, wherein the positioning element of the sink accessory comprises at least one second bearing surface, separate from the first bearing surface and the underside surface, with which the sink accessory is placed, in a second position, on a second supporting surface of the sink or on a supporting surface of another sink accessory, wherein the second bearing surface of the positioning element of the sink accessory is arranged at a different height level of the sink accessory than the first bearing surface and the underside surface, wherein the positioning element of the sink accessory comprises at least one lower surface, separate from the first bearing surface, the second bearing surface, and the underside surface, wherein the lower surface of the positioning element of the sink accessory is arranged at a lower height level of the sink accessory than the first bearing surface, the second bearing surface, and the underside surface when the sink accessory is placed in the first and second positions, wherein the positioning element of the sink accessory comprises:

at least one first positioning surface separate from the first bearing surface and disposed at an angle thereto and separate from the second bearing surface and disposed at an angle thereto, which cooperates with a first positioning surface of the sink when the sink accessory is placed on the sink in order to fix the sink accessory in a working position relative to the sink, in order to guide the sink accessory in the course of a displacement relative to the sink along a direction of displacement or in order to limit the displacement path of the sink accessory relative to the sink, and at least one second positioning surface separate from the first bearing surface and disposed at an angle thereto and separate from the second bearing surface and disposed at an angle thereto, which cooperates with a second positioning surface of the sink or with a positioning surface of another sink accessory when the sink accessory is placed on the sink or on the other sink accessory in order to fix the sink accessory in a working position relative to the sink or relative to the other sink accessory, in order to guide the sink accessory laterally in the course of a displacement relative to the sink or relative to the other sink accessory along a direction of displacement, or in order to limit the displacement path of the sink accessory relative to the sink or relative to the other sink accessory, wherein the second positioning surface is arranged at a different height level of the sink accessory than the first positioning surface.

2. The combination in accordance with claim 1, wherein the sink accessory comprises at least two first positioning surfaces which are arranged at a same first height level of the sink accessory and both of which extend along the same direction of the sink accessory and are spaced from each other in a direction perpendicular to this direction, and at least two second positioning surfaces which are likewise arranged at a same second height level wherein this second height level is different from the first height level of the first positioning surfaces of the sink accessory and which extend along the same direction of the sink accessory and are spaced from each other in a direction perpendicular to this direction, wherein the second positioning surfaces are at a different spacing from each other than the first positioning surfaces.

3. The combination in accordance with claim 2, wherein the second positioning surfaces are arranged at a lower height level of the sink accessory than the first positioning surfaces.

4. The combination in accordance with claim 2, wherein the second positioning surfaces are at a smaller spacing from each other than the first positioning surfaces.

5. The combination in accordance with claim 1, wherein the sink accessory comprises at least two first positioning surfaces which are both arranged at a same first height level of the sink accessory and are oriented transversely, preferably substantially perpendicularly, to one another, and also at least two second positioning surfaces which are likewise arranged at a same second height level of the sink accessory, wherein the second height level is different from the first height level of the first positioning surfaces, and said second surfaces are oriented transversely, preferably substantially perpendicularly, to one another.

6. The combination in accordance with claim 1, wherein at least one first bearing surface and one first positioning surface of the sink accessory border one another and together form a first positioning step of the sink accessory.

7. The combination in accordance with claim 1, wherein at least one second bearing surface and at least one second positioning surface of the sink accessory border one another and together form a second positioning step of the sink accessory.

8. The combination in accordance with claim 1, wherein the sink accessory comprises a plurality of positioning elements.

9. The combination in accordance with claim 1, wherein the sink accessory comprises at least four positioning elements.

10. The combination in accordance with claim 8, wherein one or more of the positioning elements is in the form of a foot part of the sink accessory.

11. The combination in accordance with claim 8, wherein the sink accessory comprises a base body to which the at least one positioning element is attached.

12. The combination in accordance with claim 11, wherein the at least one positioning element is adhered to the base body.

13. The combination in accordance with claim 12, wherein the positioning element comprises at least one recess for accommodating an adhesive.

14. The combination in accordance with claim 13, wherein the positioning element is provided with at least one spacer which is arranged in the region of the recess for accommodating the adhesive.

15. The combination in accordance with claim 11, wherein the base body of the sink accessory comprises at least one substantially transparent region and at least one substantially non-transparent region and wherein the at least one positioning element is attached to the substantially non-transparent region of the base body.

16. The combination in accordance with claim 1, wherein the sink accessory is in the form of a cutting board.

17. The combination in accordance with claim 1 wherein the sink accessory is a first sink accessory, the combination further comprising a second sink accessory upon which the first sink accessory is adapted to be placed.

18. The combination in accordance with claim 17, wherein the second sink accessory is a container that is adapted to be hung on the sink.

* * * * *